US007318277B2

(12) United States Patent
Torimoto et al.

(10) Patent No.: US 7,318,277 B2
(45) Date of Patent: Jan. 15, 2008

(54) METHOD OF MANUFACTURING A LIQUID JET HEAD

(75) Inventors: Tatsuro Torimoto, Nagano-ken (JP); Akira Matsuzawa, Nagano-ken (JP); Mutsuhiko Ota, Nagano-ken (JP); Tetsushi Takahashi, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 421 days.

(21) Appl. No.: 11/133,469

(22) Filed: May 20, 2005

(65) Prior Publication Data

US 2005/0262691 A1 Dec. 1, 2005

(30) Foreign Application Priority Data

May 24, 2004 (JP) ............................ 2004-153840
Sep. 13, 2004 (JP) ............................ 2004-265244
Sep. 30, 2004 (JP) ............................ 2004-287893

(51) Int. Cl.
*B21D 53/76* (2006.01)
*G01D 15/00* (2006.01)

(52) U.S. Cl. ...................... 29/890.1; 29/25.35; 29/831; 29/832; 29/842; 29/844; 216/27

(58) Field of Classification Search ............... 29/890.1, 29/25.35, 830, 831, 832, 842, 843, 844; 347/68-70, 347/65; 216/27, 37, 96, 101; 310/311, 328, 310/317, 357
See application file for complete search history.

(56) References Cited

U.S. PATENT DOCUMENTS 4,894,664 A * 1/1990 Tsung Pan ................... 347/63
5,148,185 A * 9/1992 Abe et al. ..................... 347/65
6,260,960 B1 * 7/2001 Hashizume et al. .......... 347/70
6,398,348 B1 * 6/2002 Haluzak et al. ............... 347/63

FOREIGN PATENT DOCUMENTS

JP 2003-159801 * 6/2003

* cited by examiner

*Primary Examiner*—A. Dexter Tugbang
*Assistant Examiner*—Tai Van Nguyen
(74) *Attorney, Agent, or Firm*—Sughrue Mion, PLLC

(57) ABSTRACT

A method of manufacturing a liquid jet head includes the steps of: forming a piezoelectric element on one plane of a passage-forming substrate with a vibration plate interposed therebetween, and removing the vibration plate in an area where a communicating portion is formed, thus forming a penetrated hole; forming a predetermined metal layer on the one plane of the passage-forming substrate on which the piezoelectric element is formed to seal the penetrated hole with the metal layer, and patterning the metal layer in an area corresponding to the piezoelectric element, thus forming a lead electrode; adhering a reservoir-forming plate, in which a reservoir portion is formed, to the one plane of the passage-forming substrate; wet-etching the passage-forming substrate from the other plane thereof until the vibration plate and the metal layer are exposed, thus forming a pressure generating chamber and the communicating portion; and removing the metal layer by etching to allow the reservoir portion and the communicating portion to communicate with each other.

15 Claims, 12 Drawing Sheets

METHOD OF MANUFACTURING A LIQUID JET HEAD

BACKGROUND OF THE INVENTION

1. Field of the Invention

The present invention relates to a manufacturing method of a liquid jet head ejecting liquid and, more particularly, to a manufacturing method of an inkjet print head ejecting ink as liquid.

2. Description of the Related Art

An inkjet print head (for instance, refer to Japanese Unexamined Patent Publication No. 2003-159801), which is a liquid jet head, includes: for example, a passage-forming substrate over which a pressure generating chamber communicating with a nozzle orifice and a communicating portion communicating with the pressure generating chamber are formed; a piezoelectric element formed on one plane of the passage-forming substrate; and a reservoir-forming plate which is adhered to the piezoelectric element-side of the passage-forming substrate and which has a reservoir portion constituting a part of a reservoir in association with the communicating portion. Here, the reservoir is formed by allowing the reservoir portion and the communicating portion to communicate with each other through. a penetrated portion penetrating a vibration plate and a multi-layered film provided on the vibration plate. Specifically, portions of the vibration plate and the. multi-layered film which face the communicating portion (reservoir portion) are mechanically punched to form the penetrated portion, whereby the reservoir portion and the communicating portion are allowed to communicate with each other.

However, in the case of forming the penetrated portion by machining, there is the problem that foreign particles such as residues in mechanical fabrication are generated and that the foreign particles get into a passage such as the pressure generating chamber to cause malfunctions in ink ejection and the like. Note that after forming the penetrated portion, by performing cleaning for instance, the foreign particles such as residues in fabrication can be removed to some extent but it is difficult to completely remove them. Further, as a consequence of the machining of the penetrated portion, there arises the problem that cracks and the like are generated at the circumference of the penetrated portion and that malfunctions in ink ejection are caused by the generation of cracks. That is, there arises the following problem: when ink is ejected from the nozzle orifice fully charged with ink under this cracked condition, the cracked portions are separated as fragments, and malfunctions in ink ejection are caused by a blockage of the nozzle orifice due to the fragments.

In the aforementioned Patent Document 1, in order to solve the above-described problems, disclosed is a configuration which can prevent generation of foreign particles by fixing the multi-layered film with a covering film made of resin material. By adopting this configuration, generation of foreign particles may be partially prevented but it is difficult to completely prevent malfunctions in ink ejection caused by the foreign particles.

Note that a problem of this sort surely exits in manufacturing methods of other liquid jet heads ejecting liquids other than ink besides a manufacturing method of an inkjet print head for ejecting ink.

SUMMARY OF THE INVENTION

In view of the circumstances described above, an object of the present invention is to provide a manufacturing method of a liquid jet head which can reliably prevent malfunctions in ink ejection, such as a blockage of a nozzle by foreign particles.

According to a first aspect of the present invention to provide a solution of the object described above, a method of manufacturing a liquid jet head includes the steps of: forming a piezoelectric element including a lower electrode, a piezoelectric layer, and an upper electrode on one plane of a passage-forming substrate with a vibration plate interposed therebetween, the passage-forming substrate which is made of a silicon substrate and in which a pressure generating chamber communicating with a nozzle orifice ejecting liquid and a communicating portion communicating with the pressure generating chamber are formed, and removing a region of the vibration plate where the communicating portion is formed, thus forming a penetrated hole; forming a predetermined metal layer on the one plane of the passage-forming substrate over which the piezoelectric element is formed, thus sealing the penetrated hole with the metal layer, and patterning the metal layer in a region corresponding to the piezoelectric element, thus forming a lead electrode extending from the piezoelectric element; adhering a reservoir-forming plate, in which a reservoir portion communicating with the communicating portion to constitute a part of a reservoir is formed, to the one plane of the passage-forming substrate; wet-etching the passage-forming substrate from the other plane thereof until the vibration plate and the metal layer are exposed, thus forming the pressure generating chamber and the communicating portion; and removing a region of the metal layer corresponding to the penetrated hole by etching to allow the reservoir portion and the communicating portion to communicate with each other.

In the case of the first aspect, when forming the reservoir, there is no possibility of generating foreign particles such as residues from fabrication. Thus, the manufacturing method can reliably prevent malfunctions in ink ejection, such as a blockage of a nozzle by foreign particles and the like. Further, when etching the passage-forming substrate, the wrapping-around of etchant into the reservoir-forming plate side through the penetrated hole can also be prevented, and damage and the like to the reservoir-forming plate by the etchant can also be prevented.

A second aspect of the present invention is related to the method of manufacturing a liquid jet head as described in the first aspect, characterized in that the metal layer is removed by performing a wet-etching process in the step of causing the reservoir portion and the communicating portion to communicate with each other.

In the case of the second aspect, the metal layer can be adequately removed in an extremely short time.

A third aspect of the present invention is related to the method of manufacturing a liquid jet head as described in the second aspect, characterized by further including a step of forming a sacrificial layer, which is made of a material having an etching selectivity to the metal layer, in a region corresponding to the peripheral portion of the penetrated hole before the step of forming the metal layer. In addition, the method of manufacturing a liquid jet head is characterized in that the step of causing the reservoir portion and the communicating portion to communicate with each other includes: a step of wet-etching the metal layer through the sacrificial layer, and thereby forming a penetrated portion in the metal layer; and a step of removing the sacrificial layer in a region which is opposed to the penetrated hole.

In the case of the third aspect, adhesiveness of a liquid protective film around a boundary portion between the reservoir portion and the communicating portion is increased in a case where the liquid protective film having liquid resistance is formed in the pressure generating chamber, the reservoir and the like.

A fourth aspect of the present invention is related to the method of manufacturing a liquid jet head as described in the third aspect, characterized in that the sacrificial layer is removed by a dry-etching process.

In the case of the fourth aspect, only the sacrificial layer in the reservoir can be removed. This further increases the adhesiveness of the liquid protective film.

A fifth aspect of the present invention is related to the method of manufacturing a liquid jet head as described in any one of the third aspect and the fourth aspect, characterized in that the sacrificial layer is made of any one of a metal film, an oxide film, a nitride film or an organic film.

In the case of the fifth aspect, use of a predetermined film as the sacrificial layer makes it possible to remove the sacrificial layer in the penetrated holes relatively easily and adequately.

According to a sixth aspect of the present invention, a method of manufacturing a liquid jet head includes the steps of: forming a piezoelectric element including a lower electrode, a piezoelectric layer, and an upper electrode on one plane of a passage-forming substrate with a vibration plate interposed therebetween, the passage-forming substrate which is made of a silicon substrate and in which a pressure generating chamber communicating with a nozzle orifice ejecting liquid and a communicating portion communicating with the pressure generating chamber are formed, and removing a region of the vibration plate where the communicating portion is formed, thus forming a penetrated hole; adhering a reservoir-forming plate, in which a reservoir portion communicating with the communicating portion to constitute a part of a reservoir is formed, to the one plane of the passage-forming substrate; forming a metal layer serving as connection wiring on the reservoir-forming plate, thus sealing the penetrated hole with the metal layer; wet-etching the passage-forming substrate from the other plane thereof until the vibration plate and the metal layer are exposed, thus forming the pressure generating chamber and the communicating portion; and patterning the metal layer to form the connection wiring-, and removing a region of the metal layer facing the penetrated hole by etching to allow the reservoir portion and the communicating portion to communicate with each other.

In the case of the sixth aspect, when forming the reservoir, there is no possibility of generating foreign particles such as residues from fabrication. Thus, the manufacturing method can reliably prevent malfunctions in ink ejection, such as a blockage of a nozzle by foreign particles and the like. Further, when etching the passage-forming substrate, the wrapping-around of etchant into the reservoir-forming plate side through the penetrated hole can be prevented, and damage and the like to the reservoir-forming plate by the etchant can also be prevented.

A seventh aspect of the present invention is related to the method of manufacturing a liquid jet head as described in the sixth aspect, characterized in that, in the step of causing the reservoir portion and the communicating portion to communicate with each other, the metal layer is removed by a wet-etching process.

In the case of the seventh aspect, the metal layer can be adequately-removed in an extremely short time.

An eighth aspect of the present invention is related to the method of manufacturing a liquid jet head as described in any one of the first and sixth aspects, characterized in that, in the step of causing the reservoir portion and the communicating portion to communicate with each other, the metal layer is removed by a dry-etching process.

In the case of the eighth aspect, only the metal layer in regions which are respectively opposed to the penetrated holes can be adequately removed .

A ninth aspect of the present invention is related to the method of manufacturing a liquid jet head as described in any one of the first to eighth aspects, characterized in that any one of gold, aluminum, copper, platinum and iridium is used as a primary material for the metal layer, and that an adhesion layer made of any one of tungsten, nickel and chromium is formed underneath the metal layer.

In the case of the ninth aspect, a lead electrode is formed adequately, and the penetrated holes are securely sealed off with the metal layer.

According to a tenth aspect of the present invention, a method of manufacturing a liquid jet head includes the steps of: forming a piezoelectric element including a lower electrode, a piezoelectric layer, and an upper electrode on one plane of a passage-forming substrate with a vibration plate interposed therebetween, the passage-forming substrate which is made of a silicon substrate and in which a pressure generating chamber communicating with a nozzle orifice ejecting liquid and a communicating portion communicating with the pressure generating chamber are formed, and removing a region of the vibration plate where the communicating portion is formed, thus forming a penetrated hole; adhering a reservoir-forming plate, in which a reservoir portion communicating with the communicating portion to constitute a part of a reservoir is formed, to the one plane of the passage-forming substrate; forming a protective film on the reservoir-forming plate to seal the penetrated hole with the protective film, the protective film being made of a material different from that of the reservoir-forming plate and protecting connection wiring formed on the reservoir-forming plate; wet-etching the passage-forming substrate from the other plane thereof until the vibration plate and the protective film are exposed, thus forming the pressure generating chamber and the communicating portion; and removing a region of the protective film by etching to allow the reservoir portion and the communicating portion to communicate with each other.

In the case of the tenth aspect, when forming the reservoir, there is no possibility of generating foreign particles such as residues from fabrication. Thus, the manufacturing method can reliably prevent malfunctions in ink ejection, such as a blockage of a nozzle by foreign particles and the like. Further, when etching the passage-forming substrate, the wrapping-around of etchant into the reservoir-forming plate side through the penetrated hole can be prevented, and damage and the like to the reservoir-forming plate by the etchant can also be prevented.

An eleventh aspect of the present invention is related to the method of manufacturing a liquid jet head as described in the tenth aspect, characterized in that, in the step of causing the reservoir portion and the communicating portion to communicate with each other, the protective layer is removed by a wet-etching process.

In the case of the eleventh aspect, the metal layer can be removed adequately in an extremely short time.

A twelfth aspect of the present invention is related to the method of manufacturing a liquid jet head as described in the tenth aspect, characterized in that, in the step of causing the reservoir portion and the communicating portion to communicate with each other, the protective layer is removed by a dry-etching process.

In the case of the twelfth aspect, only the metal layer in the regions which are respectively opposed to the penetrated holes can be adequately removed According to a thirteenth aspect of the present invention, in any one of the tenth to twelfth aspects, in the method of manufacturing a liquid jet head according to the third aspect, a material different from that of the connection wiring is used as the protective film.

In the case of the thirteenth aspect described above, when etching the protective film, simultaneous etching of the connection wiring can be prevented and the protective film can be relatively easily removed.

According to a fourteenth aspect of the present invention, in any one of the tenth to twelfth aspects, in the method of manufacturing a liquid jet head according to the fifth aspect, the protective film is made of any one of an oxide film, a nitride film, an organic film and a metal film.

In the case of the fourteenth aspect described above, the protective film can be relatively easily formed and the penetrated hole can be reliably sealed with the protective film.

DETAILED DESCRIPTION OF THE PREFERRED EMBODIMENTS

Hereinafter, the present invention will be described in detail based on embodiments.

Embodiment 1

Figure 1:
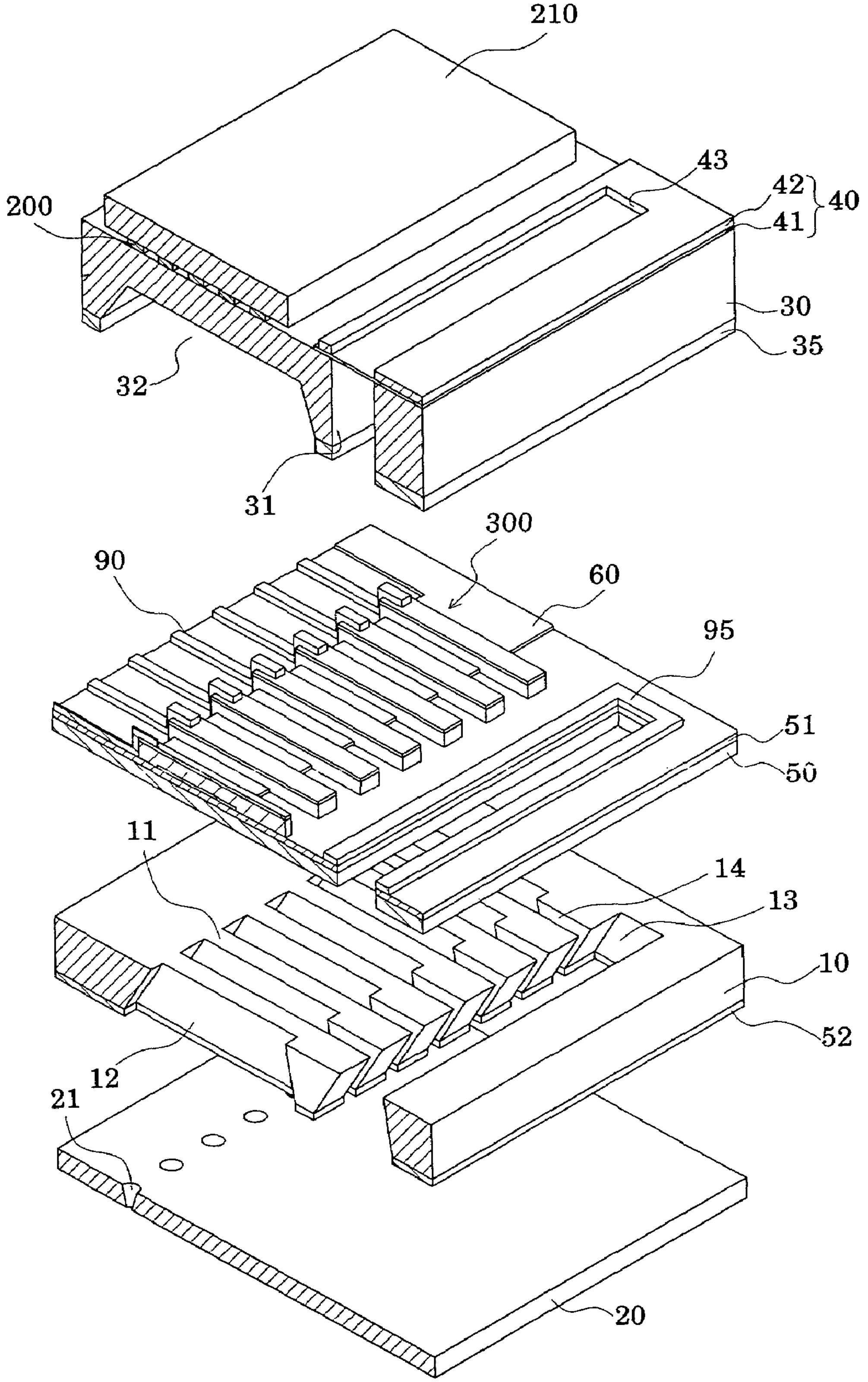
FIG. 1 is an exploded perspective view of a print head according to embodiment 1.
Figure 2A:
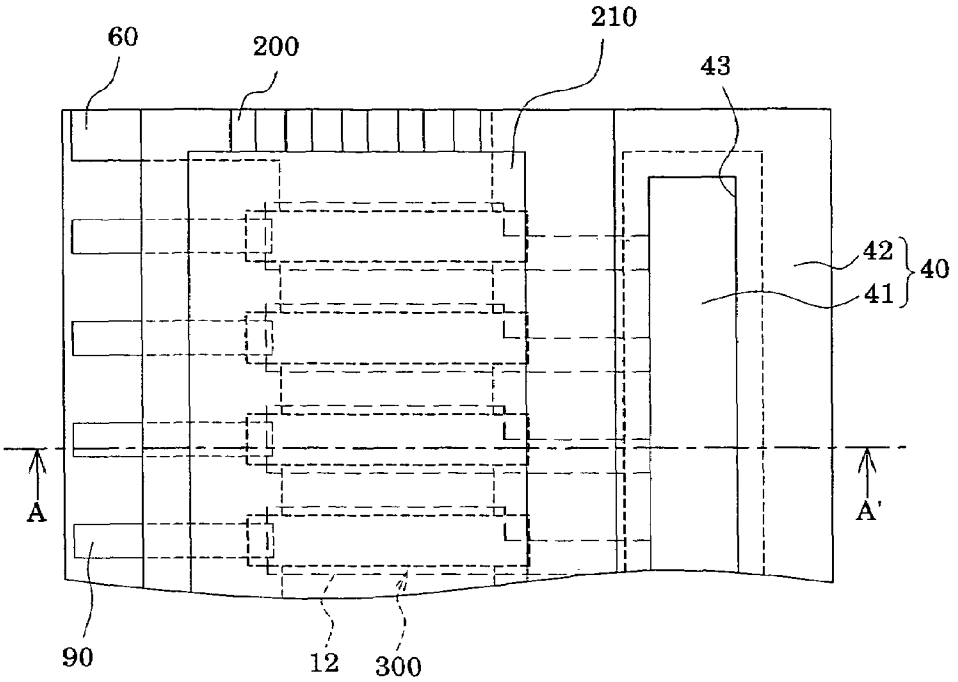
FIGS. 2A and 2B are a plan view and a cross-sectional view of a print head according to embodiment 1, respectively.
Figure 2B:
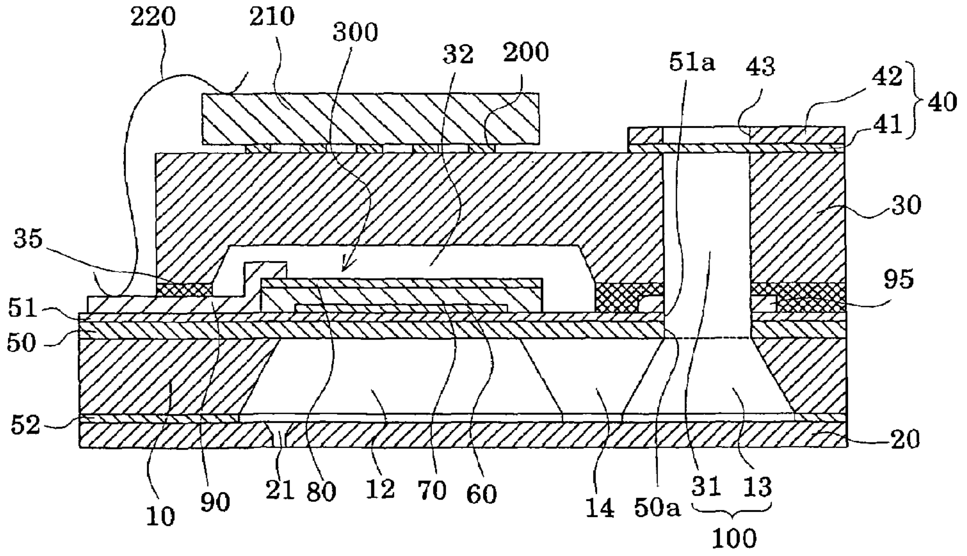

FIG. 1 is an exploded perspective view- showing an inkjet print head manufactured by a manufacturing method according to embodiment 1 of the present invention, and FIGS. 2A and 2B are a plan view and a cross-sectional view of FIG. 1, respectively. As shown in FIGS. 1 to 2B, a passage-forming substrate 10 is formed by a single crystal silicon substrate with a plane orientation (110) in this embodiment. An elastic film 50 of 1 to 2 μm thickness, which is made of silicon dioxide, is formed in advance on one plane of the substrate 10 by thermal oxidation In the passage-forming substrate 10, a plurality of pressure generating chambers 12 are disposed in parallel along the direction of its width. Further, a communicating portion 13 is formed in the area exterior of a plurality of pressure generating chambers 12 along the longitudinal direction in the passage-forming substrate 10, and the communicating portion 13 and each pressure generating chamber 12 are allowed to communicate with each other through an ink supply path 14 which is provided for each of the pressure generating chambers 12. The communicating portion 13 communicates with a reservoir portion 31 in a reservoir-forming plate 30 to be described later, and constitutes a part of a reservoir 100 to be formed as a common ink chamber for the pressure generating chambers 12. The ink supply path 14 is formed narrower in width than the pressure generating chamber 12, and maintains an ink passage resistance of ink flowing into the pressure generating chamber 12 from the communicating portion 13.

Further, a nozzle plate 20 having drilled nozzle orifices 21 which communicates with the proximity of the opposite end portions of the pressure generating chambers 12 from the ink supply paths 14 is fixed to an opening surface side of the passage-forming substrate 10 with an adhesive agent, a thermal welding film or the like with a mask film 52 interposed therebetween, which is used as a mask for forming the pressure generating chambers 12. Note that the thickness of the nozzle plate 20 is, for example, 0.01 to 1 mm, and is made of glass ceramics, a single crystal silicon substrate, stainless steel or the like having a linear expansion coefficient of, for example, 2.5 to 4.5 ($\times 10^{-6}$/° C.) at below 300° C.

Meanwhile, on the plane opposite the opening surface of the passage-forming substrate 10, the elastic film 50 having a thickness of, for instance, about 1.0 μm is formed as described above. On this elastic film 50, an insulation film 51 having a thickness of, for instance, about 0.4 μm is formed. Further, on the insulation film 51, a lower electrode film 60 having, for instance, a thickness of about 0.2 μm, a piezoelectric layer 70 having, for instance, a thickness of about 1.0 μm, and an upper electrode film 80 having, for instance, a thickness of about 0.05 μm are formed to be in a stack by a process described hereinafter, and constitute piezoelectric elements 300. Here, the piezoelectric element 300 refers to a portion including the lower electrode film 60, the piezoelectric layer 70 and the upper electrode film 80. In general, either one of the electrodes of the piezoelectric element 300 is set as a common electrode, and the other electrode thereof and piezoelectric layer 70 are configured by patterning for each of the pressure generating chambers 12. A portion, which is configured of either of the patterned electrodes and the piezoelectric layer 70 and is caused to generate piezoelectric strain by applying a voltage to both electrodes, is referred to as a piezoelectric active portion. In this embodiment, the lower electrode film 60 is set as a common electrode of the piezoelectric elements 300 and the upper electrode film 80 is set as an individual electrode of each piezoelectric element 300. However, depending on a driver circuit and wiring, a reversed positioning thereof can be acceptable without causing any problems. Whichever the case may be, the piezoelectric active portion shall be formed for each pressure generating chamber. Furthermore, here, a combination of the piezoelectric element 300 and a vibration plate which generates displacement driven by this piezoelectric element 300 is referred to as a piezoelectric actuator.

Still further, the upper electrode film 80 of each piezoelectric element 300 described above is electrically connected to a respective lead electrode 90 made of a metal layer of, for instance, gold (Au). A voltage is selectively applied to each piezoelectric element 300 through this lead electrode 90. Though details are described hereinafter, on the insulation film 51 in an area corresponding to the circumference portion of an opening of the communicating portion 13, a metal layer 95 exists in the same layer as that of this lead electrode 90.

The reservoir-forming plate 30 having the reservoir portion 31 constituting at least a part of the reservoir 100 is adhered with an adhesive agent 35 to the surface of the passage-forming substrate 10 where the piezoelectric elements 300 are held. The reservoir portion 31 of the reservoir-forming plate 30 is allowed to communicate with the communicating portion 13 through penetrated holes 50*a* and 51*a* provided in the vibration plate, which is, in this embodiment, a combination of the elastic film 50 and the insulation film 51. Thus, the reservoir 100 is formed of this reservoir portion 31 and this communicating portion 13.

In the area of the reservoir-forming plate 30 which is opposed to the piezoelectric elements 300, a piezoelectric element holding portion 32 is disposed. Since the piezoelectric elements 300 are formed in this piezoelectric element holding portion 32, they are protected under the condition that they are virtually free from the influence of the external environment. Note that the piezoelectric element holding portion 32 may be hermetically sealed or may not be hermetically sealed. As to a material for the reservoir-forming plate 30 described above, materials such as glass, ceramics, metal and resin can be listed. However, it is desirable that the reservoir-forming plate 30 be formed of a material having about the same thermal expansion coefficient as that of the passage-forming substrate 10. In this embodiment, a single crystal silicon substrate, which is made of the same material as that of the passage-forming substrate 10, is used.

Further, on the reservoir-forming plate 30, connection wiring 200 formed in a predetermined pattern is disposed. On this connection wiring 200, a driver IC 210 for driving the piezoelectric elements 300 is mounted. The driver IC 210 is electrically connected to the tip portion of each lead electrode 90 via drive wiring 220. Here, the lead electrodes 90 are extended from the piezoelectric elements 300 to the area outside of the piezoelectric element holding portion 32.

Furthermore, a compliance plate 40 made of a sealing film 41 and a clamping plate 42 is adhered to the area of the reservoir-forming plate 30 which corresponds to the reservoir portion 31. The sealing film 41 is made of a flexible material having low rigidity (for instance, a polyphenylene sulfide (PPS) film of 6 μm thickness). With this sealing film 41, one end of the reservoir portion 31 is sealed. Further, the clamping plate 42 is formed of a hard material such as a metal (for instance, stainless steel (SUS) of 30 μm thickness). Since the area of this clamping plate 42 which faces to the reservoir 100 forms an opening portion 43 in which the clamping plate 42 is completely removed in the thickness direction, one end of the reservoir 100 is sealed only with the sealing film 41 having flexibility.

In the inkjet print head of this embodiment described above, ink is taken in from external ink supply means (not shown); after filling with ink the internal part from the reservoir 100 to the nozzle orifice 21, a voltage is applied between the lower electrode film 60 and the upper electrode films 80 respectively corresponding to the pressure generating chambers 12, in accordance with a print signal supplied from the driver IC 210; and the piezoelectric element 300 and the vibration plate deform by being bent, whereby an inside pressure of each pressure generating chamber 12 is increased and ink is ejected out of the nozzle orifices 21.

Figure 3A:
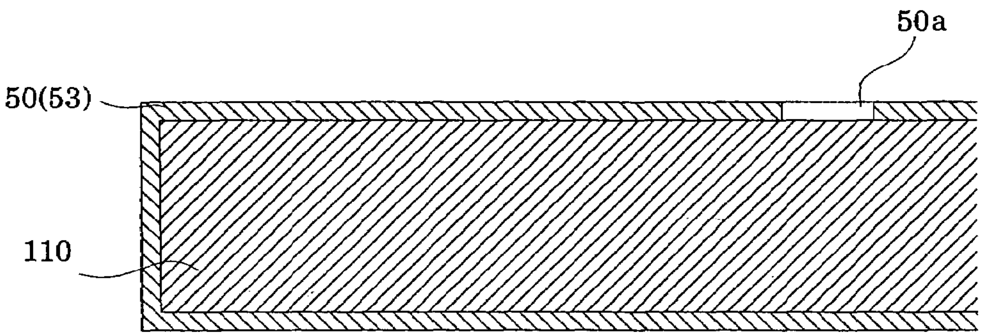
FIGS. 3A to 3C are cross-sectional views showing a manufacturing process of a print head according to embodiment 1.

Hereinbelow, the manufacturing method of the inkjet print head shown above is described with reference to FIGS. 3A to 6B. Note that FIGS. 3A to 6B are cross-sectional views along the longitudinal direction of the pressure generating chambers 12. First, as shown in FIG. 3A, a wafer 110 for a passage-forming substrate which is a silicon wafer is subjected to thermal oxidation in a diffusion furnace at a temperature of about 1100° C., and a silicon dioxide film 53 which constitutes the elastic film 50 is formed on the surface thereof. Then, by patterning this elastic film 50, the penetrated hole 50*a* penetrating the elastic film 50 is formed in the elastic film 50 in the area of the wafer 110 for a passage-forming substrate where the communicating portion (not shown) is formed. Note that, in this embodiment, a silicon wafer, which has a relatively large thickness of about 625 μm and has high rigidity, is used as the wafer 110 for a passage-forming substrate.

Figure 3B:
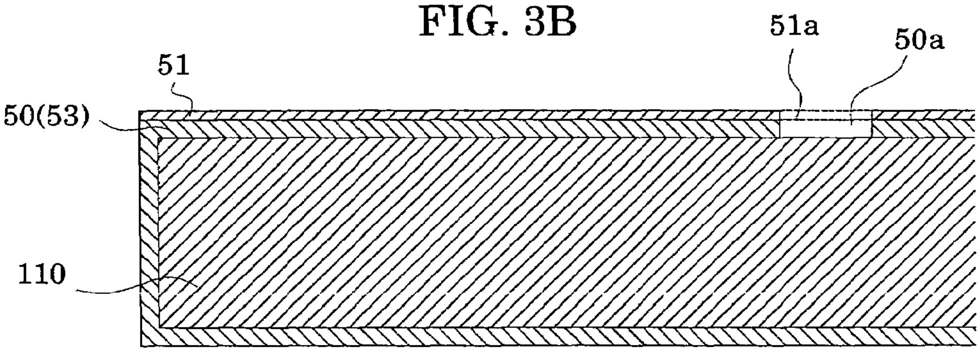

Next, as shown in FIG. 3B, the insulation film 51 made of zirconium dioxide is formed on the elastic film 50 (silicon dioxide film 53). Specifically, a zirconium (Zr) layer is formed on the elastic film 50 (silicon dioxide film 53) by, for instance, sputtering. Subsequently, the insulation film 51 made of zirconium dioxide ($ZrO_2$) is formed by thermal oxidation in a diffusion furnace at a temperature of, for example, 500 to 1200° C. Thereafter, by patterning this insulation film 51, the penetrated hole 51*a* penetrating the insulation film 51 is formed in the insulation film 51 in the area of the elastic film 50 which faces the penetrated hole 50*a*.

Figure 3C:
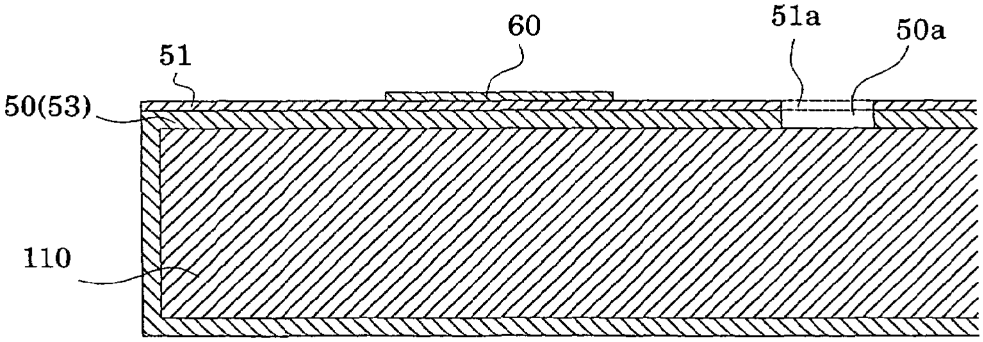
Figure 4A:
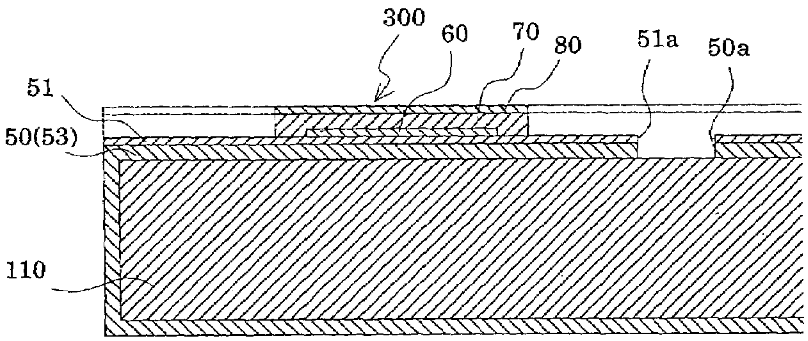
FIGS. 4A to 4C are cross-sectional views showing a manufacturing process of a print head according to embodiment 1.

Subsequently, as shown in FIG. 3C, for example, after the lower electrode film 60 is formed by stacking platinum and iridium on the insulation film 51, this lower electrode film 60 is patterned into a predetermined shape. Next, as shown in FIG. 4A, the piezoelectric layer 70 made of, for example, lead zirconate titanate (PZT) and the upper electrode film 80 made of, for example, iridium are formed on the entire surface of the wafer 110 for a passage-forming substrate. Then, the piezoelectric elements 300 are formed by patterning the piezoelectric layer 70 and the upper electrode film 80 in the area facing to the respective pressure generating chambers 12.

Note that, as to a material for the piezoelectric layer 70 constituting the piezoelectric elements 300, for example, a ferroelectric-piezoelectric material such as lead zirconate titanate (PZT), or relaxor ferroelectrics such as the ferroelectric-piezoelectric material listed above doped with metal such as niobium, nickel, magnesium, bismuth or yttrium is used. The composition of the piezoelectric layer 70 may be selected as appropriate considering the characteristics, usage and the like of the piezoelectric elements 300. For instance, $PbTiO_3$ (PT), $PbZrO_3$ (PZ), $Pb(Zr_xTi_{1-x})O_3$ (PZT), Pb $(Mg_{1/3}Nb_{2/3})$ $O_3$—$PbTiO_3$ (PMN-PT), Pb $(Zn_{1/3}Nb_{2/3})$ $O_3$—$PbTiO_3$ (PZN-PT), Pb $(Ni_{1/3}Nb_{2/3})$ $O_3$—$PbTiO_3$ (PNN-PT), Pb $(In_{1/2}Nb_{1/2})$ $O_3$—PbTiO3 (PIN-PT), Pb $(Sc_{1/3}Ta_{2/3})$ $O_3$—$PbTiO_3$ (PST-PT), Pb $(Sc_{1/3}Nb_{2/3})$ $O_3$—$PbTiO_3$ (PSN-PT), $BiScO_3$—$PbTiO_3$ (BS-PT), or $BiYbO_3$—$PbTiO_3$ (BY-PT) can be selected.

Further, a forming method of the piezoelectric layer 70 is not specifically limited. However, for example, in this embodiment, the piezoelectric layer 70 is formed using a well-known sol-gel method: a sol in which a metal-organic substance is dissolved and diffused in a catalytic agent is applied and dried to produce a gel, and further the gel is baked at a high temperature to obtain the piezoelectric layer 70 made of a metal-oxide substance.

Figure 4B:
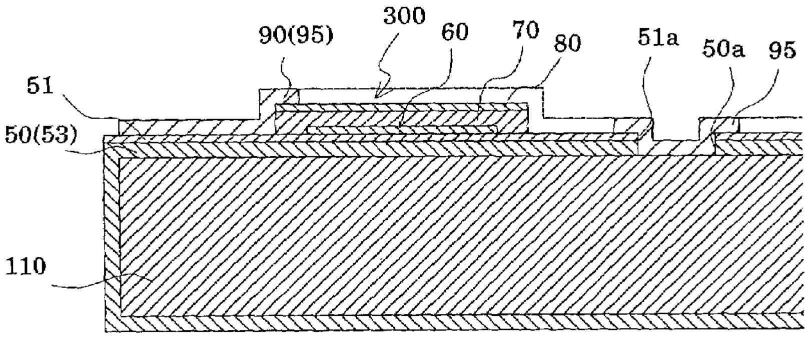

Next, as shown in FIG. 4B, the lead electrodes 90 are formed. Specifically, first, the metal layer 95 made of gold (Au) or the like is formed over the entire surface of the wafer 110 for a passage-forming substrate. At this moment, the penetrated holes 50*a* and 51*a* are sealed with this metal layer 95. Then, a mask pattern (not shown) made of, for instance, a resist is formed on this metal layer 95, and the lead electrodes 90 are formed by patterning the metal layer 95 through this mask pattern for each piezoelectric element 300. Note that the metal layer 95 in the area corresponding to the penetrated holes 50*a* and 51*a* is left remaining so that the area is to be discontinuous with the lead electrodes 90.

Here, as to the primary material for the metal layer 95, there is no particular restriction if the material has a relatively high conductivity, but it is preferable to use gold (Au), aluminum (Al), copper (Cu), platinum (Pt) or iridium (Ir) for instance. In addition, when the metal layer 95 described above is formed, it is preferable that an adhesion layer for securing adhesiveness of the metal layer 95 (lead electrode 90) be formed beforehand underneath the metal layer 95. As a material for the adhesion layer, for example, tungsten (W), nickel (Ni), chromium (Cr) and the like can be listed. However, it is preferable that particularly titanium-tungsten (TiW), nickel-chromium (NiCr) or the like be used. Incidentally, although the penetrated holes 50*a* and 51*a* are designed to be sealed with the metal layer 95 in the case of this embodiment, the penetrated holes 50*a* and 51*a* may be sealed with only the adhesion layer in a case where the adhesion layer is formed underneath the metal layer 95.

Figure 4C:
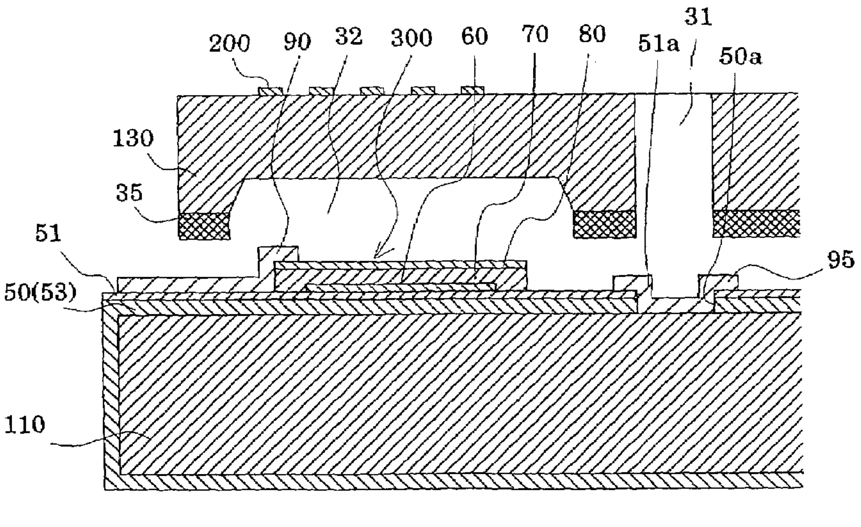

Next, as shown in FIG. 4C, a wafer 130 for a reservoir-forming plate is adhered to the wafer 110 for a passage-forming substrate by using an adhesive agent 35. Here, in the wafer 130 for a reservoir-forming plate, the reservoir portion 31, the piezoelectric element holding portion 32 and the like have been already formed, and on the wafer 130 for a reservoir-forming plate, the aforementioned connection wiring 200 has already been formed. Note that the wafer 130 for a reservoir-forming plate is, for instance, a silicon wafer of a thickness of about 400 μm. The rigidity of the wafer 110 for a passage-forming substrate is considerably increased by adhering the wafer 130 for a reservoir-forming plate thereto.

Figure 5A:
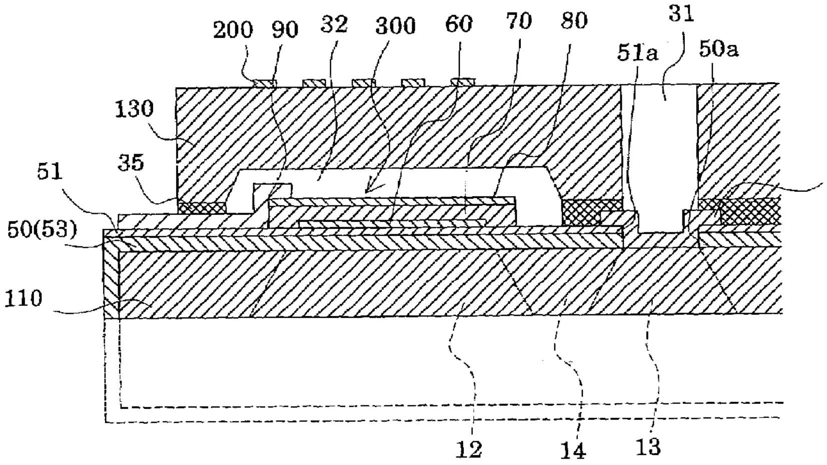
FIGS. 5A to 5C are cross-sectional views showing a manufacturing process of a print head according to embodiment 1.
Figure 5B:
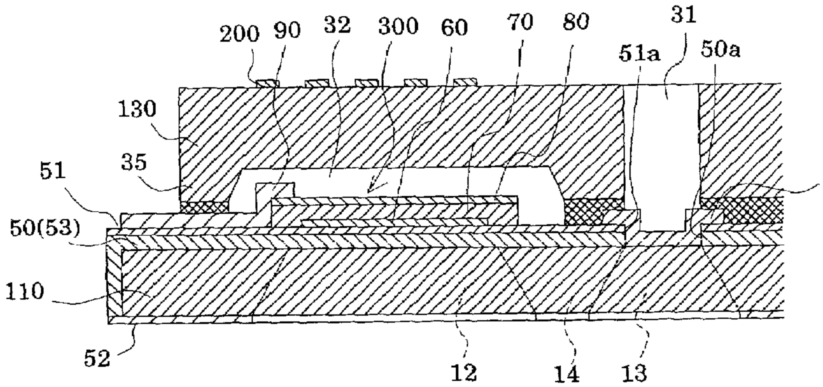
Figure 5C:
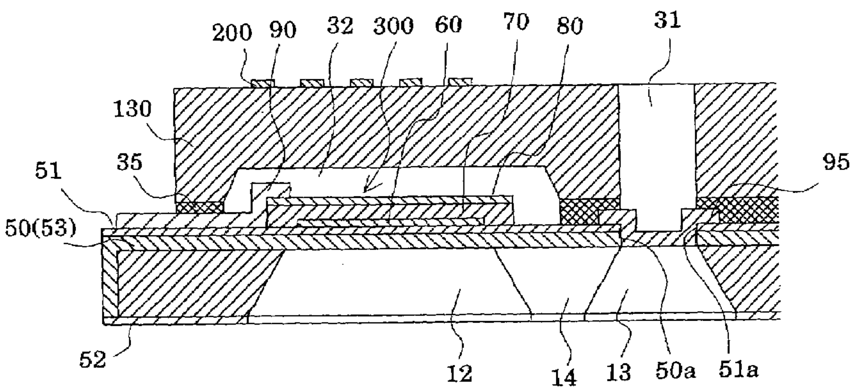

Next, as shown in FIG. 5A, after grinding the wafer 110 for a passage-forming substrate up to some thickness, the thickness of the wafer 110 for a passage-forming substrate is set to a predetermined thickness by performing wet etching with fluoro-nitric acid. For example, in this embodiment, the wafer 110 for a passage-forming substrate is processed by grinding and wet etching so that it has a thickness of about 70 μm. Next, as shown in FIG. 5B, a mask film 52 made of, for instance, silicon nitride (SiN) is newly formed on the wafer 110 for a passage-forming substrate, and is patterned in a predetermined shape. Then, as shown in FIG. 5C, the wafer 110 for a passage-forming substrate is subjected to anisotropic etching (wet etching) through this mask film 52, and the pressure generating chambers 12, the communicating portion 13, the ink supply paths 14 and the like are formed in the wafer 110 for a passage-forming substrate. Specifically, the pressure generating chambers 12, the communicating portion 13, and the ink supply paths 14 are formed simultaneously by etching the wafer 110 for a passage-forming substrate with etchant such as a potassium hydrate (KOH) solution until the elastic film 50 and the metal layer 95 are exposed.

At this moment, since the penetrated holes 50*a* and 51*a* are sealed with the metal layer 95, the etchant will not flow into the side where the wafer 130 for a reservoir-forming plate is located, through the penetrated holes 50*a* and 51*a*. Because of this, the etchant will not come into contact with the connection wiring 200 which is deposited on the surface of the wafer 130 for a reservoir-forming plate. Thus, occurrence of malfunctions such as breaking of wiring can be prevented. Furthermore, there is no possibility that the wafer 130 for a reservoir-forming plate is etched with the etchant intruded into the reservoir portion 31.

Note that in the case of forming the pressure generating chambers 12 described above, the surface of the wafer 110 for a reservoir-forming plate, which is opposite from the surface having the wafer 110 for a passage-forming substrate, may be further sealed with a sealing film made of an alkali-proof substance, such as PPS (polyphenylene sulfide) or PPTA (poly-paraphenylene terephthalamide). By doing so, malfunctions such as a break in wiring disposed on the surface of the wafer 130 for a reservoir-forming plate can be prevented with much higher certainty.

Figure 6A:
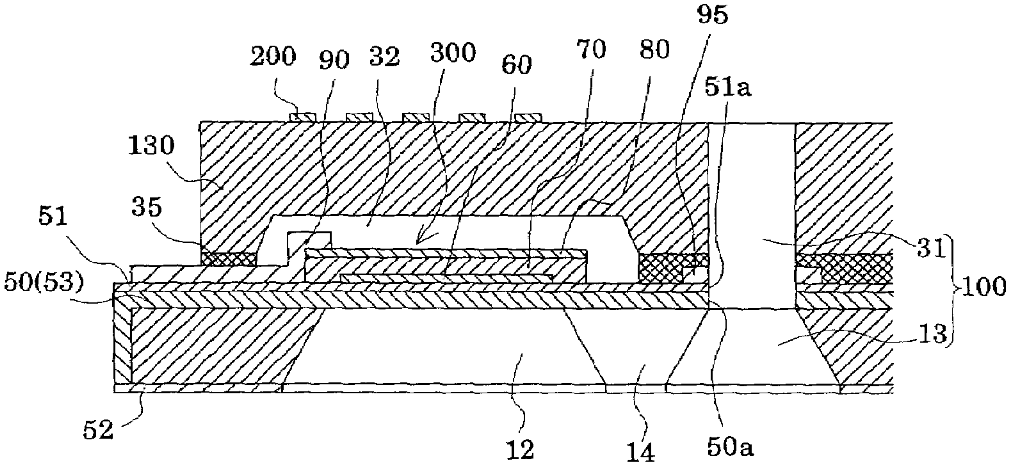
FIGS. 6A and 6B are cross-sectional views showing a manufacturing process of a print head according to embodiment 1.
Figure 6B:
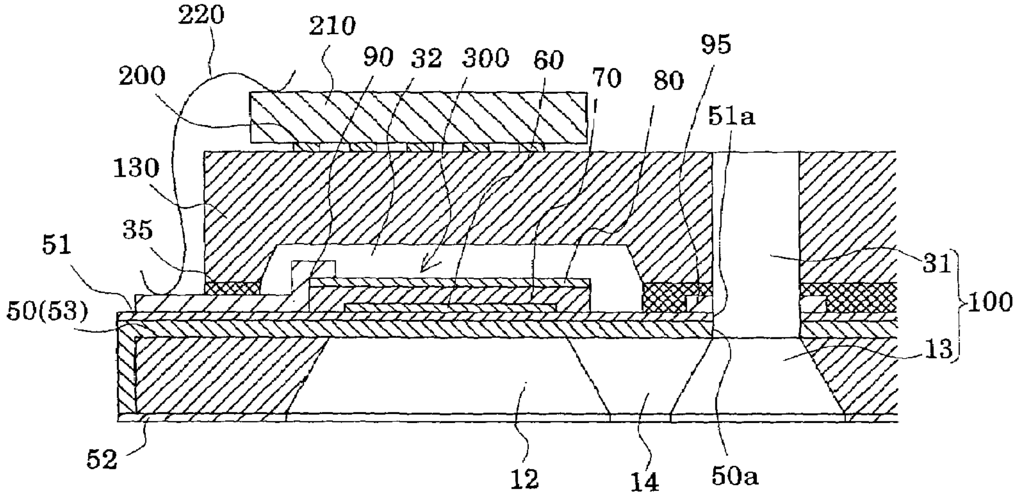

Next, as shown in FIG. 6A, by removing the metal layer 95 in the area which faces the penetrated holes 50*a* and 51*a* by etching, the communicating portion 13 and the reservoir portion 31 are allowed to communicate with each other through the penetrated holes 50*a* and 51*a*. Thereby the reservoir 100 is formed. For example, in the case of this embodiment, the metal layer 95 is removed by a wet-etching process using the predetermined etchant. In this occasion, the metal layer 95 between the wafer 130 for a reservoir-forming plate and the wafer 110 for a passage-forming substrate is not etched completely. Therefore, the metal layer 95 at the periphery of the penetrated holes 50*a* and 51*a* remains.

Further, after forming the reservoir 100 as described above, as shown in FIG. 6B, the driver IC 210 is mounted on the connection wiring 200 which is formed on the wafer 130 for a reservoir-forming plate. At the same time, the driver IC 210 and the lead electrodes 90 are electrically connected through the driving wiring 220. Thereafter, unnecessary parts of the outer periphery of the wafer 110 for a passage-forming substrate and the wafer 130 for a reservoir-forming plate are cut out by, for instance, dicing. Then, the nozzle plate 20 having the nozzle orifices 21 drilled therethrough is bonded to the opposite plane of the wafer 110 for a passage-forming substrate from the wafer 130 for a reservoir-forming plate. At the same time, the compliance plate 40 is bonded to the wafer 130 for a reservoir-forming plate. By dividing the wafer 110 for a passage-forming substrate and the like into the passage-forming substrate 10 and the like which correspond to a single chip size as shown in FIG. 1, the inkjet print head having the configuration described hereinbefore is manufactured.

As described above, in this embodiment, the penetrated holes 50*a* and 51*a* are sealed with the metal layer 95 which is in the same layer as the lead electrodes 90, and the reservoir portion 31 and the communicating portion 13 are allowed to communicate with each other by removing this metal layer 95 ultimately by use of etching. Due to this series of processing, there is no possibility of generating foreign particles such as residues from fabrication unlike conventional machining. Therefore, it is ensured to reliably prevent malfunctions in ink ejection such as a blockage in a nozzle caused by residues from fabrication, by preventing residues in fabrication from remaining in ink flowing passages such as the pressure generating chambers 12 and the communicating portion 13. Furthermore, in the case of this embodiment, since the metal layer 95 is designed to be removed by the wet-etching process, the metal layer 95 can be adequately removed in an extremely short time.

It should be noted that, although the metal layer 95 is removed by the wet-etching process in the case of this embodiment, a process for removing the metal layer 95 is not specifically limited to the wet-etching, and that the metal layer 95 may be removed by a dry-etching process. Since the metal layer 95 is made of gold (Au) or the like as described above, the metal layer 95 can be adequately removed by an ion-milling process or the like Furthermore, as described above, in a case where the adhesion layer made, for example, of titanium-tungsten (TiW) or the like is formed underneath the metal layer 95, the adhesion layer may be removed, first of all, by a plasma dry-etching process using a fluoro carbon-based etching gas, for example, carbon tetrafluoride ($CF_4$), and thereafter the metal layer 95 may be removed by the ion-milling process.

Embodiment 2

FIGS. 7A to 9C are cross-sectional views showing a manufacturing method of an inkjet print head according to embodiment 2. This embodiment is an example, where a communicating portion 13 is formed while penetrated holes 50*a* and 51*a* are being sealed with not only a metal layer 95 but also a sacrificial layer 140, and where thereafter the metal layer 95 and the sacrificial layer 140 are removed so as to cause the communicating portion and a reservoir portion to communicate with each other.

Specifically, first, as in embodiment 1, piezoelectric elements 300 are formed on a wafer 110 for a passage-forming substrate, and then, the penetrated holes 50*a* and 51*a* are formed. Furthermore, the lead electrodes 90 are formed (refer to FIGS. 3A to 4A). Incidentally, in the case of this embodiment, the penetrated hole 51*a* in an insulation film 51 is formed in such a way that an opening area of the penetrated hole 51*a* in the insulation film 51 is larger than that of the penetrated hole 50*a* in an elastic film 50 (see FIG. 7A). It goes without saying that these penetrated holes 50*a* and 51*a* may be formed in the same size.

Figure 7A:
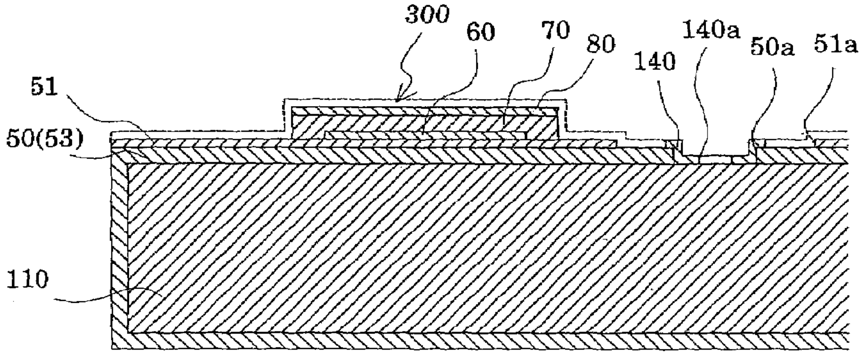
FIGS. 7A to 7C are cross-sectional views showing a manufacturing process of a print head according to embodiment 2.

Next, as shown in FIG. 7A, a sacrificial layer 140 is formed on an entire surface of a wafer 110 for a passage-forming substrate, the surface being near a piezoelectric element 300, and thereafter the sacrificial layer 140 is patterned into a predetermined shape. In this manner, the sacrificial layer 140 is formed in a region corresponding to a periphery of the penetrated hole 50*a*, for example, inside the penetrated hole 50*a* in the case of this embodiment. Specifically, the sacrificial layer 140 is formed in a way that the sacrificial layer extends out by a predetermined length, for example, by approximately 10,,m, towards the inside of the penetrated hole 50*a*. An orifice 140*a* is formed in a region opposed to the penetrated hole 50*a*.

In this respect, it suffices that the sacrificial layer 140 were formed of a material having an etching selectivity to the metal layer 95 which is formed on the sacrificial layer 140 in a step, which will be described later. It is preferable that the sacrificial layer 140 be made, for example, of a metal film, an oxide film, an organic film or the like. In addition, it is preferable that the sacrificial layer 140 be removed by a dry-etching process. For this reason, it is preferable that, specifically, a material such as copper (Cu), chromium (Cr) or silicon nitride (SiN) be used. Incidentally, in the case of this embodiment, silicon nitride is used as the material for the sacrificial layer 140.

Figure 7B:
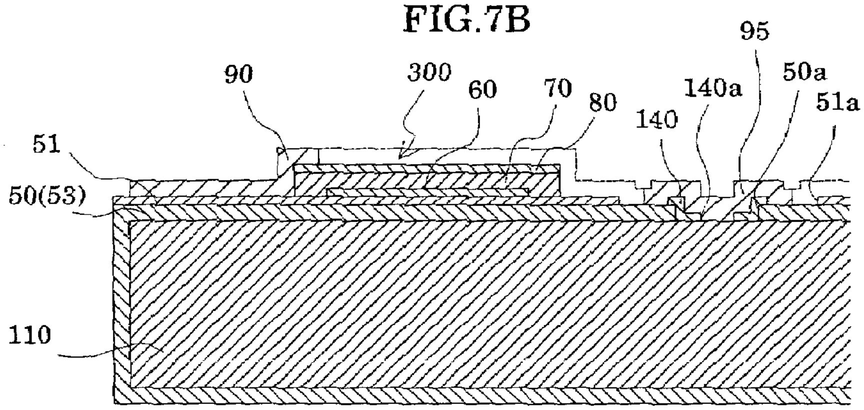

Subsequently, as shown in FIG. 7B, the metal layer 95 is formed on an entire surface of the wafer 110 for a passage-forming substrate, and thereafter the metal layer 95 is patterned, as in the case of embodiment 1. In this manner, a lead electrode 90 is formed. At this time, regions of the metal layer 95 corresponding respectively to the penetrated holes 50*a* and 51*a* are left remaining in a way that the regions are discontinuous with the lead electrode 90. Accordingly, the metal layer 95 thus remaining, along with the orifice 140*a* of the sacrificial layer 140, seals the penetrated hole 50*a*. Incidentally, although the metal layer 95 is formed in the region opposite the penetrated hole 51*a* in the case of this embodiment, a position in which to form the metal layer 95 is not specifically limited to this. It goes without saying that the metal layer 95 may be formed so as to be continuous up to the area outside of the penetrated hole 51*a*.

Figure 7C:
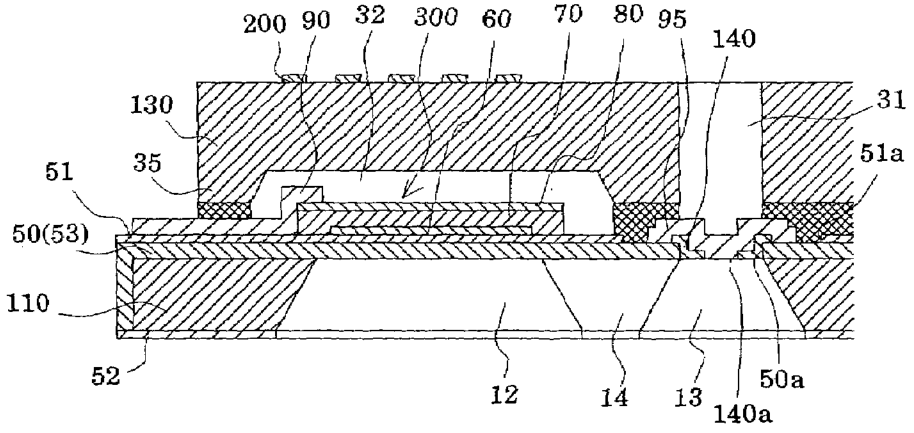

Thereafter, the wafer 110 for a passage-forming substrate and a wafer 130 for a reservoir-forming plate are bonded to each other, and thus the wafer 110 for a passage-forming substrate is processed with a predetermined thickness, as in the case of embodiment 1 (see FIGS. 4C and 5A). Subsequently, the wafer 110 for a passage-forming substrate is wet-etched, and thus a pressure generating chamber 12, a communicating portion 13 and the like are formed, as shown in FIG. 7C.

Figure 8A:
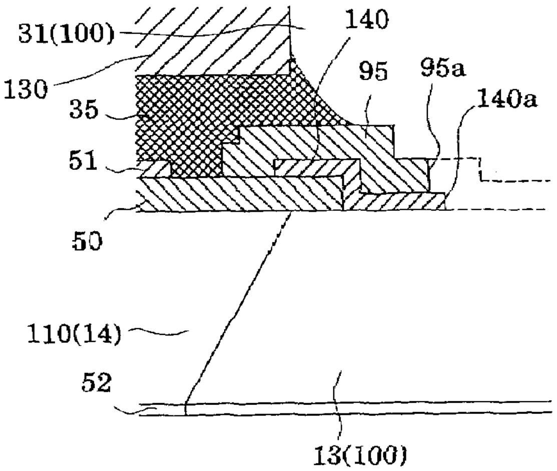
FIGS. 8A to 8C are cross-sectional views showing a manufacturing process of a print head according to embodiment 2.

Then, the metal layer 95 is wet-etched through an orifice 140*a* in the sacrificial layer 140, and thereby a penetrated portion 95*a* is formed in the metal layer 95, as shown in FIG. 8A. In other words, the reservoir portion 31 and the communicating portion 13 are caused to communicate with each other through this penetrated portion 95*a*, and thus a reservoir 100 constituted of the reservoir portion 31 and the communicating portion 13 is formed.

Note that, while the metal layer 95 is being etched, the metal layer 95 is etched by approximately several ,,m in the plane direction (side-etched), in addition to be etched in the thickness direction. For this reason, the penetrated portion 95*a* in the metal layer 95 is formed so as to be slightly larger than the orifice 140*a* in the sacrificial layer 140.

In addition, when the metal layer 95 is intended to be removed by the wet-etching process in this manner, it is preferable that the metal layer 95 be protected by means of adhering a thermal release sheet or the like to an entire surface of the wafer 130 for a reservoir-forming plate. The thermal release sheet is, for example, a sheet whose base material is polyester film, and the thermal release sheet can be easily released off by means of heating the thermal release sheet to a predetermined temperature (thermal release temperature). In the case of this embodiment, the thermal release sheet which has a thermal release temperature lower than, for example, 140° C. is used. Use of such a thermal release sheet makes it possible to prevent occurrence of problems, including breaking of wiring provided to the surface of the wafer 130 for a reservoir-forming plate. In addition, such a thermal release sheet can be released off merely by means of heating.

Figure 8B:
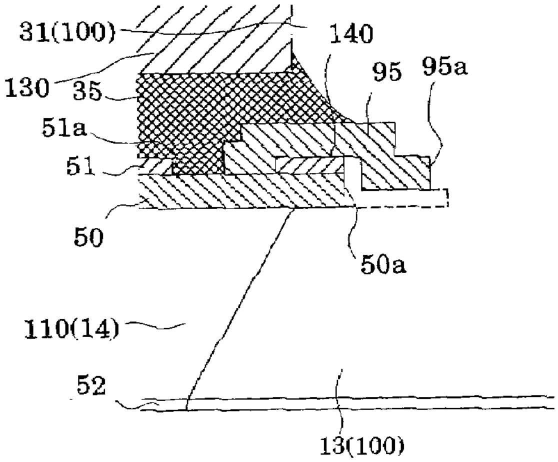
Figure 8C:
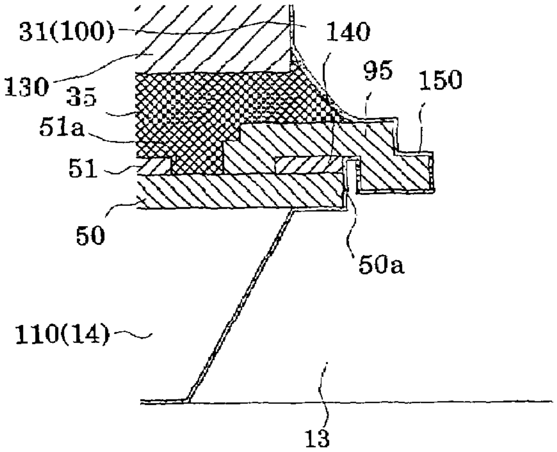

Subsequently, the sacrificial layer 140 is removed as shown in FIG. 8B. In this occasion, it is preferable that only part of the sacrificial layer 140, which part extends out towards the inside of the reservoir 100, be removed. To this end, the sacrificial layer 140 is removed by only the dry-etching process, in the case of this embodiment. As a result of this, only the metal layer 95 is left remaining in a state of extending out towards the inside of the reservoir 100. Incidentally, a width in which the metal layer 95 extends out is as extremely small as approximately several ,,m, while on the contrary a width of the reservoir 100 is, for example, approximately 1.2 mm. Consequently, it is unlikely that the part of the metal layer 95 extending out badly affects the passage of the ink.

Thence, an ink protective film 150 made of an ink-resistant (liquid-resistant) material, for example tantalum pentoxide or the like, is formed in internal surfaces respectively of a pressure generating chamber 12, an ink supply path 14 and the reservoir 100 by a CVD process or the like.

In this respect, the penetrated portion 95*a* is formed in the metal layer 95 through the sacrificial layer 140 in the aforementioned manner, and the sacrificial layer 140 is removed by the dry-etching process, in the case of this embodiment. Accordingly, the metal layer 95 is left remaining in a state of extending out towards the inside of the reservoir 100. For this reason, adhesiveness of the ink protective film 150 is increased while the ink protective film 150 is being formed on the inner surface of the reservoir 100. Accordingly, the ink protective film 150 can be adequately formed on the entire internal surface of the reservoir 100.

Additionally, according to such a manufacturing method, ejection problems, such as blockage of a nozzle due to residues in fabrication which have remained in the ink path including the pressure generating chamber 12 and the reservoir 100, can be securely prevented from occurring, as in the case of embodiment 1.

Embodiment 3

FIGS. 9 and 10 are respectively cross-sectional views showing a method of manufacturing an inkjet print head according to embodiment 3. This embodiment is an example of modifying the configuration according to embodiment 1 in the following manner. A communicating portion 13 is formed while penetrated holes 50*a* and 51*a* are sealed with a metal layer 205 which is formed as the same layer as connection wiring 200 to be formed on a reservoir-forming plate 30 (a wafer 130 for a reservoir-forming plate 130) is formed, instead of with the metal layer 95 which is formed as the same layer as the lead electrode 90 is formed. Thereafter, this metal layer 205 is removed, and thus a communicating portion 13 and a reservoir portion 31 are caused to communicate with each other.

Figure 9A:
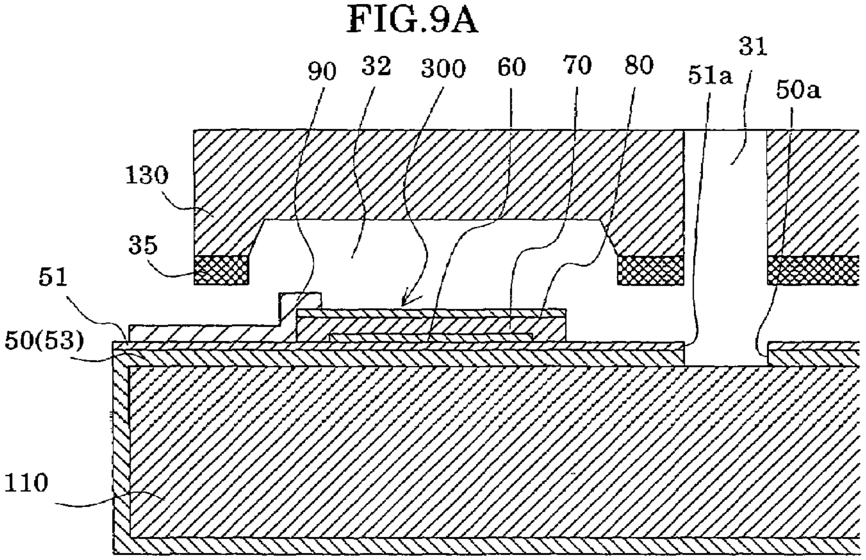
FIGS. 9A to 9C are cross-sectional views showing a manufacturing process of a print head according to embodiment 3.

Specifically, first of all, a piezoelectric element 300 is formed on a wafer 110 for a passage-forming substrate, and penetrated holes 50*a* and 51*a* are formed thereon, as in the case of embodiment 1. In addition, a lead electrode 90 is formed thereon (see FIGS. 3A to 4B). Incidentally, in the case of this embodiment, when the lead electrode 90 is formed, a metal layer 95 in regions opposed to the penetrated holes 50*a* and 51*a* is completely removed. Subsequently, as shown in FIG. 9A, a wafer 130 for a reservoir-forming plate is bonded to a surface of the wafer 110 for a passage-forming substrate, which surface is near a piezoelectric element 300, by an adhesive agent 35. At this time, connection wiring 200 is not formed on the wafer 130 for a reservoir-forming plate according to this embodiment.

Figure 9B:
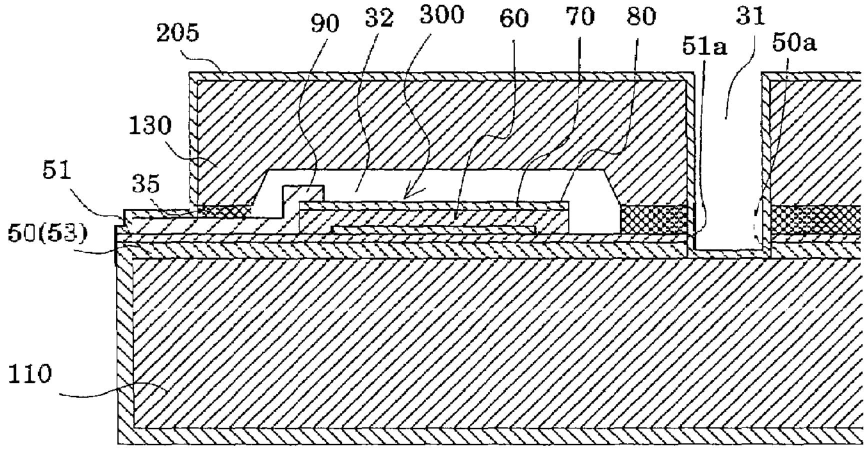

Next, as shown in FIG. 9B, the metal layer 205 which constitutes the connection wiring 200 is formed on the entire surface of the wafer 130 for a reservoir-forming plate. Here, the area where the metal layer 205 is formed continues to the inside of the reservoir portion 31. The penetrated holes 50*a* and 51*a*, which are formed in the elastic film 50 and the insulation film 51, are sealed with this metal layer 205. Note that as the primary material of the metal layer 205 constituting the connection wiring 200 as described above, for instance, gold (Au), aluminum (Al), copper (Cu), platinum (Pt) or iridium (Ir) is favorably used as in the case of the metal layer 95 constituting the lead electrodes 90. Under the metal layer 205, it is preferable that an adhesion layer made of, for instance, tungsten (W), nickel (Ni) or chromium (Cr) be formed.

Figure 9C:
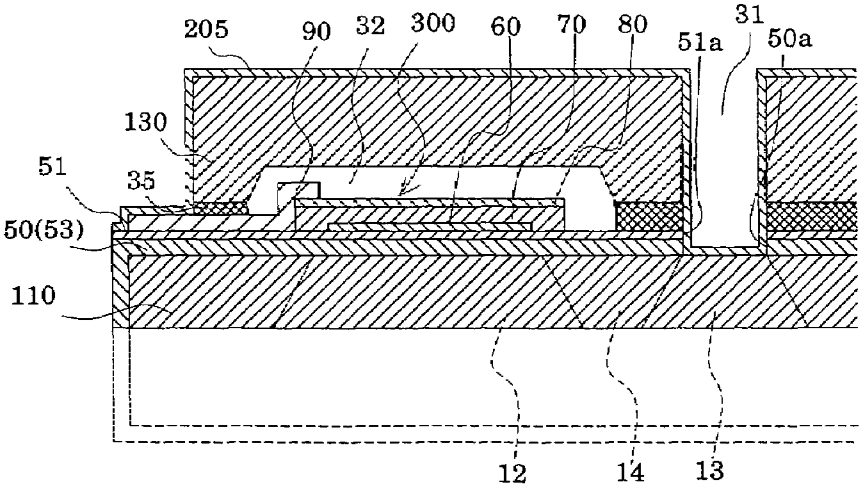
Figure 10A:
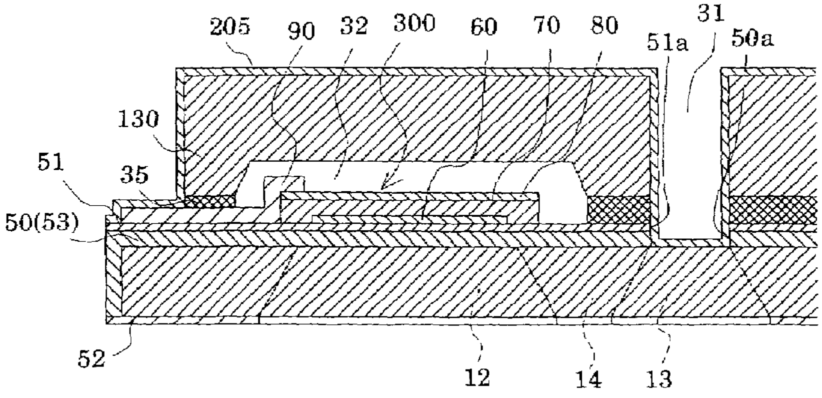
FIGS. 10A to 10C are cross-sectional views showing a manufacturing process of a print head according to embodiment 3.
Figure 10B:
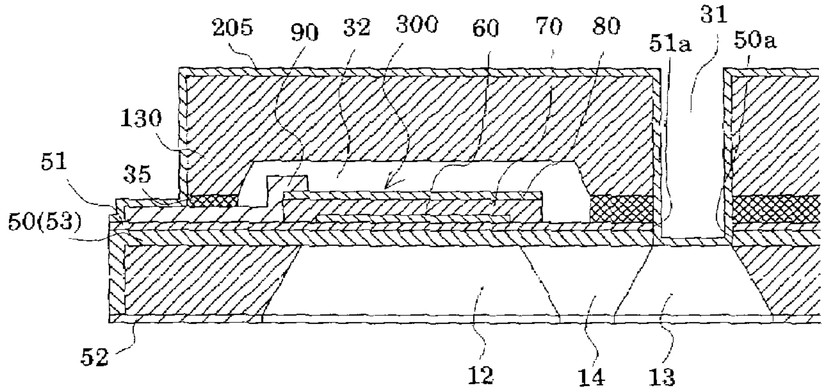
Figure 10C:
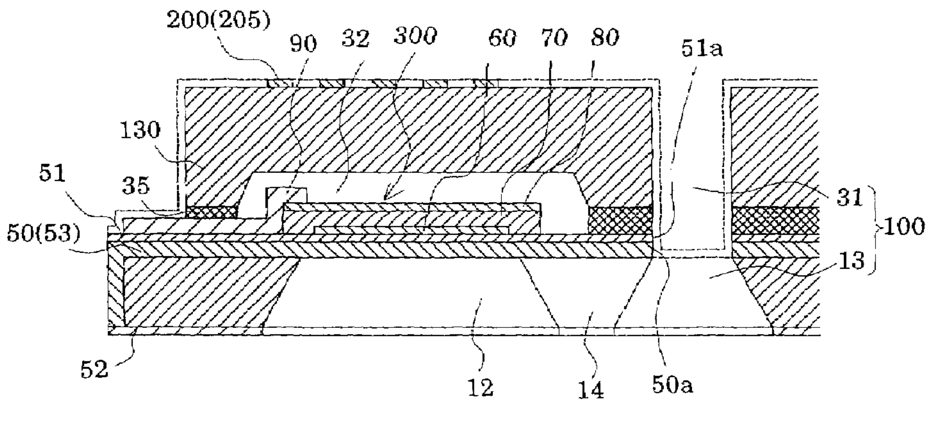

Next, as shown in FIG. 9C, the wafer for a passage-forming substrate is processed to a predetermined thickness, and as shown in FIG. 10A, a mask film 52 is formed on the surface of the passage-forming substrate 10. Thereafter, as shown in FIG. 10B, the wafer 110 for a passage-forming substrate is subjected to anisotropic etching (wet etching) through the mask film 52 until the elastic film 50 and the metal layer 205 are exposed so that pressure generating chambers 12, the communicating portion 13 and ink supply paths 14 are formed in the wafer 110 for a passage-forming substrate. Note that processing and etching steps for the wafer for a passage-forming substrate are similar to those used in the aforementioned embodiment 1.

After forming the pressure generating chambers 12, the communicating portion 13 and the like as described above, as shown in FIG. 10C, the connection wiring 200 is formed by patterning the metal layer 205. In this occasion, the metal layer 205 in the area facing the penetrated holes 50*a* and 51*a*, that is, inside the reservoir portion 31, is also removed to allow the reservoir portion 31 and the communicating portion 13 to communicate with each other through the penetrated holes 50*a* and 51*a*, thus forming a reservoir 100. Note that subsequent steps are similar to those for the aforementioned embodiment 1.

With this embodiment described hereinbefore, malfunctions in ink ejection such as a blockage in a nozzle caused by residues in fabrication remaining in ink flowing passages such as the pressure generating chambers 12 and the communicating portion 13, can be surely prevented as in the case of embodiment 1.

Embodiment 4

FIGS. 11A to 12C are cross-sectional views showing a manufacturing process of an inkjet print head according to embodiment 3. This embodiment is an example of modifying a configuration according to embodiment 1 in the following manner. A communicating portion 13 is formed in a state where penetrated holes 50*a* and 51*a* are sealed with a protective film 230, instead of a metal layer 95 which belongs to the same layer as that for lead electrodes 90; and then afterward, this protective film 230 is removed, thus allowing the communicating portion 13 and a reservoir portion 31 to communicate with each other.

Figure 11A:
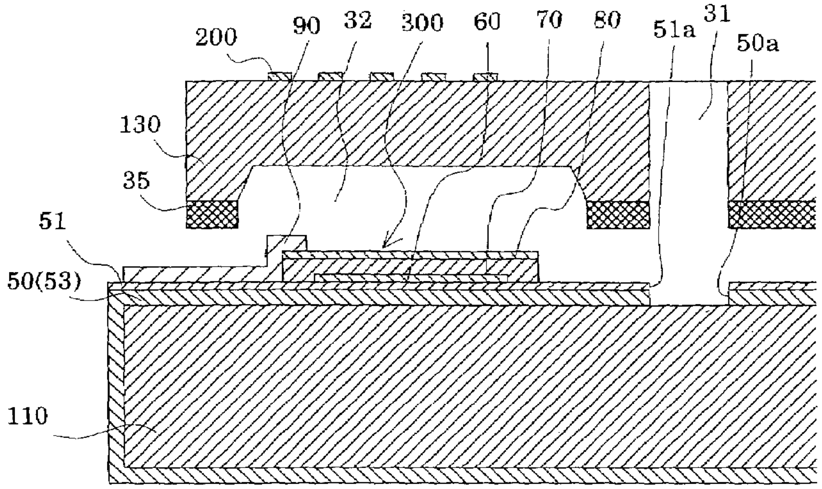
FIGS. 11A to 11C are cross-sectional views showing a manufacturing process of a print head according to embodiment 4.

Specifically, first, as in embodiment 1, piezoelectric elements 300 are formed on a wafer 110 for a passage-forming substrate, and then, the penetrated holes 50*a* and 51*a*are formed. Furthermore, the lead electrodes 90 are formed (refer to FIGS. 3A to 4B). Note that in this embodiment, too, when the lead electrodes 90 are formed, the metal layer 95 in the area where it faces the penetrated holes 50*a* and 51*a* is removed completely. Next, as shown in FIG. 11A, a wafer 130 for a reservoir-forming plate is adhered with an adhesive agent 35 to the surface of the wafer 110 for a passage-forming substrate where the piezoelectric elements 300 are located. In the wafer 130, connection wiring 200 has been formed beforehand.

Figure 11B:
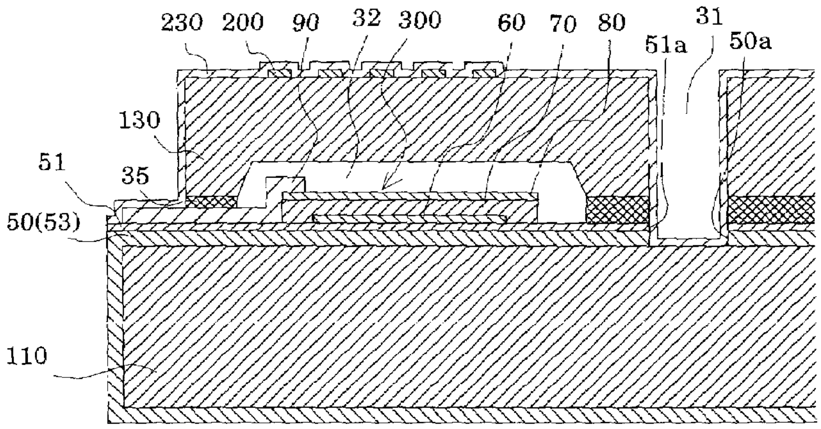
Figure 11C:
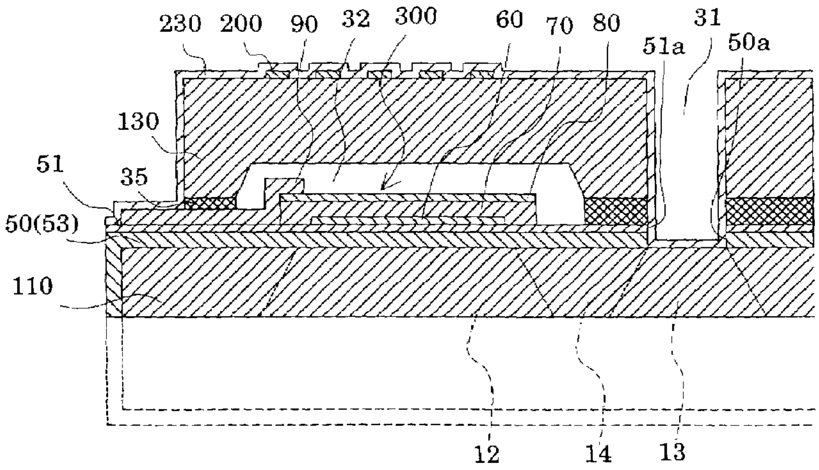

Next, as shown in FIG. 11B, the protective film 230 which is made of a different material from that of the wafer 130 for a reservoir-forming plate and which protects the connection wiring 200 is formed on the entire surface of the wafer 130 for a reservoir-forming plate. Here, the protective film 230 is formed continuously including the inside of the reservoir portion 31, and the penetrated holes 50*a* and 51*a* which are formed in an elastic film 50 and an insulation film 51 are sealed with this protective film 230. Note that the protective film 230 as described above is preferably made of, for instance, an oxide film, a nitride film, an organic film or a metal film. Further, as to the material for the protective film 230, a different material from that of the wafer 130 for a reservoir-forming plate may be used, and it is preferable to use a different material further from that of the connection wiring 200. Furthermore, as to the material for the protective film 230, it is preferable to use a different material from that of the mask film 52 which is used when forming pressure generating chambers 12 and the communicating portion 13 in the wafer 110 for a passage-forming substrate.

Figure 12A:
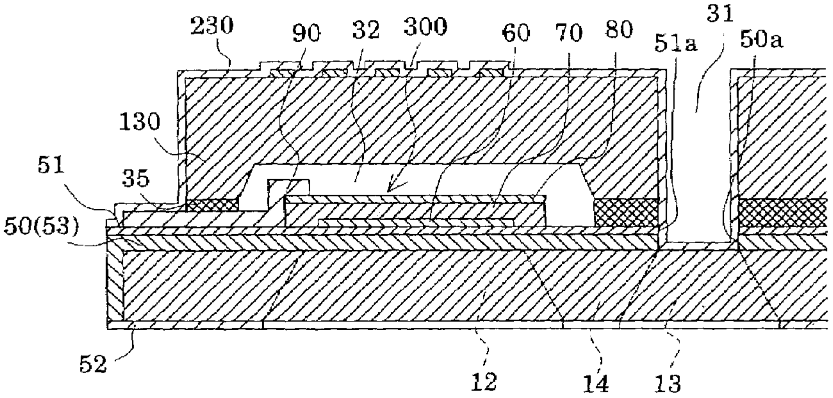
FIGS. 12A to 12C are cross-sectional views showing a manufacturing process of a print head according to embodiment 4.
Figure 12B:
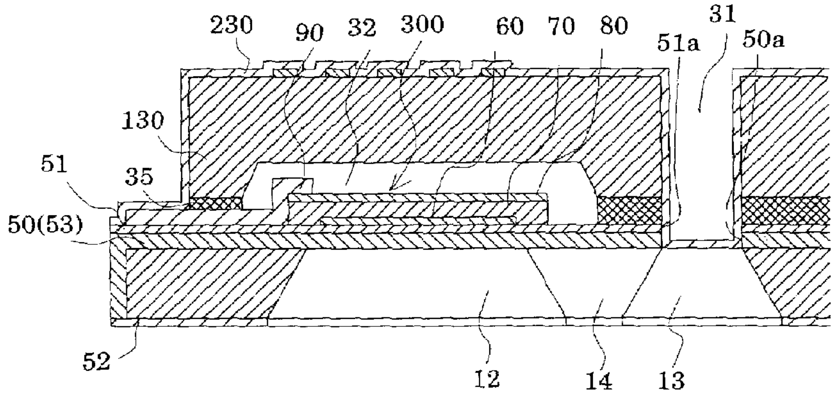
Figure 12C:
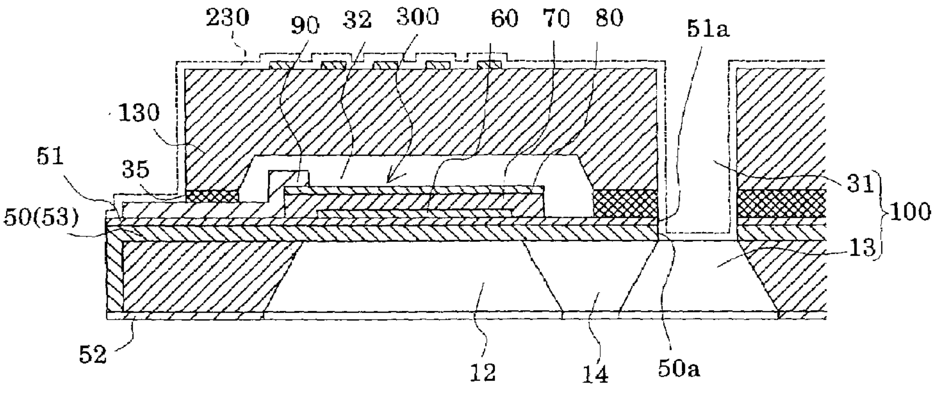

Next, as shown in FIG. 1C, the wafer 110 for a passage-forming substrate is processed to a predetermined thickness, and as shown in FIG. 12A, the mask film 52 is formed on the surface of the wafer 110 for a passage-forming substrate. Thereafter, as shown in FIG. 12B, the wafer 110 for a passage-forming substrate is subjected to anisotropic etching (wet etching) through the mask film 52 till the elastic film 50 and the protective film 230 are exposed, so that the pressure generating chambers 12, the communicating portion 13 and ink supply paths 14 are formed in the wafer 110 for a passage-forming substrate. Note that processing and etching steps for the wafer 110 for a passage-forming substrate are similar to those used in the aforementioned embodiment 1.

After forming the pressure generating chambers 12, the communicating portion 13 and the like as described above, as shown in FIG. 12C, the protective film 230 is completely removed by wet etching, and by doing so, the reservoir portion 31 and the communicating portion 13 are allowed to communicate with each other through the penetrated holes 50*a* and 51*a*, whereby a reservoir 100 is formed. Note that subsequent steps are similar to those for the embodiment 1.

With this embodiment described hereinbefore, it is needless to say that malfunctions in ink ejection such as a blockage in a nozzle caused by residues in fabrication remaining in ink flowing passages such as the pressure generating chambers 12 and the communicating portion 13 can be surely prevented as in the case of embodiment 1. Further, by forming the protective film 230 with a different material from that of the wafer 130 for a reservoir-forming plate, the protective film 230 can be easily removed at the time of etching the protective film 230, without etching the wafer 130 for a reservoir-forming plate. Furthermore, similarly, by forming the protective film 230 with a different material from that of the connection wiring 200, the protective film 230 can be easily and favorably removed at the time of etching the protective film 230, without removing the connection wiring 200. Still further, it can be quoted that the protective film 230 is preferably made of a nitride film, but the material to be used needs to be different from that of the mask film 52. In other words, in the example described hereinbefore, SiN is used for the mask film 52. Therefore, it is possible to consider that, as to the material for the protective film 230, a metal such as Nichrome (Registered trademark) can be used.

OTHER EMBODIMENTS

Hereinbefore, several embodiments of the present invention have been described. However, the present invention is not limited to the above-described embodiments. For example, in the embodiments described above, the piezoelectric elements 300 are formed after forming the penetrated holes 50*a* and 51*a*. But the other way around, the penetrated holes 50*a* and 51*a* can be formed after forming the piezoelectric elements 300. Further, in the embodiments described above, the inkjet print heads are described as an exemplary case of liquid jet heads. However, the present invention can be widely applied to various types of liquid jet heads in general, and can certainly be also applied to manufacturing methods of liquid jet heads which eject a various sorts of liquids besides ink. As other types of liquid jet heads, listed are the following heads: for example, various types of print heads used for image recording apparatuses, such as printers; color material ejection heads used for manufacturing color filters for liquid crystal displays and the like; electrode material ejection heads used for forming electrodes for organic EL displays, FEDs (Field Emission Displays), and the like; and living organic material ejection heads used for manufacturing bio-chips.

What is claimed is:

1. A method of manufacturing a liquid jet head characterized by comprising the steps of:

forming a piezoelectric element including a lower electrode, a piezoelectric layer, and an upper electrode on one plane of a passage-forming substrate with a vibration plate interposed therebetween, the passage-forming substrate which is made of a silicon substrate and in which a pressure generating chamber communicating with a nozzle orifice for ejecting liquid and a communicating portion communicating with the pressure generating chamber are formed, and removing a region of the vibration plate where the communicating portion is formed, thus forming a penetrated hole;

forming a predetermined metal layer on the one plane of the passage-forming substrate on which the piezoelectric element is formed, thus sealing the penetrated hole with the metal layer, and patterning the metal layer in an area corresponding to the piezoelectric element, thus forming a lead electrode extending from the piezoelectric element;

adhering a reservoir-forming plate, in which a reservoir portion communicating with the communicating portion to constitute a part of a reservoir is formed, to the one plane of the passage-forming substrate;

wet-etching the passage-forming substrate from the other plane thereof until the vibration plate and the metal layer are exposed, thus forming the pressure generating chamber and the communicating portion; and removing a region of the metal layer corresponding to the penetrated hole by etching to allow the reservoir portion and the communicating portion to communicate with each other.

2. The method of manufacturing a liquid jet head according to claim 1, characterized in that the metal layer is removed by wet etching in the step of allowing the reservoir portion and the communicating portion to communicate with each other.

3. The method of manufacturing a liquid jet head according to claim 2, further comprising a step of forming a sacrificial layer, which is made of a material having an etching selectivity to the metal layer, in a region corresponding to a peripheral portion of the penetrated hole before the step of forming the metal layer, characterized in that the step of allowing the reservoir portion and the communicating portion to communicate with each other includes the steps of:

wet-etching the metal layer through the sacrificial layer, and thereby forming a penetrated portion in the metal layer; and removing the sacrificial layer in a region opposite the penetrated hole.

4. The method of manufacturing a liquid jet head according to claim 3, characterized in that the sacrificial layer is removed by dry etching.

5. The method of manufacturing a liquid jet head according to claim 4, characterized in that the sacrificial layer is formed of any one of a metal film, an oxide film, a nitride film and an organic film.

6. The method of manufacturing a liquid jet head according to claim 3, characterized in that the sacrificial layer is formed of any one of a metal film, an oxide film, a nitride film and an organic film.

7. The method of manufacturing a liquid jet head according to claim 1, characterized in that the metal layer is removed by dry etching in the step of allowing the reservoir portion and the communicating portion to communicate with each other.

8. The method of manufacturing a liquid jet head according to claim 1, characterized in that any one of gold, aluminum, copper, platinum and iridium is used as a primary metal for the metal layer, and an adhesion layer made of any one of tungsten, nickel and chromium is formed underneath the metal layer.

9. A method of manufacturing a liquid jet head characterized by comprising the steps of:

forming a piezoelectric element including a lower electrode, a piezoelectric layer, and an upper electrode on one plane of a passage-forming substrate with a vibration plate interposed therebetween, the passage-forming substrate which is made of a silicon substrate and in which a pressure generating chamber communicating with a nozzle orifice ejecting liquid and a communicating portion communicating with the pressure generating chamber are formed, and removing a region of the vibration plate where the communicating portion is formed, thus forming a penetrated hole;

adhering a reservoir-forming plate, in which a reservoir portion communicating with the communicating portion to constitute a part of a reservoir is formed, to the one plane of the passage-forming substrate;

forming a metal layer serving as connection wiring on the reservoir-forming plate, thus sealing the penetrated hole with the metal layer;

wet-etching the passage-forming substrate from the other plane thereof until the vibration plate and the metal layer are exposed, thus forming the pressure generating chamber and the communicating portion; and patterning the metal layer to form the connection wiring, and removing a region of the metal layer facing the penetrated hole by etching to allow the reservoir portion and the communicating portion to communicate with each other.

10. The method of manufacturing a liquid jet head according to claim 9, characterized in that the metal layer is removed by wet etching in the step of allowing the reservoir portion and the communicating portion to communicate with each other.

11. A method of manufacturing a liquid jet head characterized by comprising the steps of:

forming a piezoelectric element including a lower electrode, a piezoelectric layer and an upper electrode on one plane of a passage-forming substrate with a vibration plate interposed therebetween, the passage-forming substrate which is made of a silicon substrate and in which a pressure generating chamber communicating with a nozzle orifice for ejecting a liquid and a communicating portion communicating with the pressure generating chamber are formed, and removing a region of the vibration plate where the communicating portion is formed, thus forming a penetrated hole;

adhering a reservoir-forming plate, in which a reservoir portion communicating with the communicating portion to constitute a part of a reservoir is formed, to the plane of the passage-forming substrate;

forming a protective film for protecting a connection wiring formed on the reservoir-forming plate, the protective film which is made of a material different from a material which the reservoir-forming plate is made of, on the reservoir-forming plate, and thus sealing the penetrated hole with the protective film;

wet-etching the passage-forming substrate from the other plane thereof until the vibration plate and the protective film are exposed, and thus forming the pressure generation chamber and the communicating portion; and removing the protective film by etching, and allowing the reservoir portion and the communicating portion to communicate with each other.

12. The method of manufacturing a liquid jet head according to claim 11, characterized in that the protective film is removed by wet etching in the step of allowing the reservoir portion and the communicating portion to communicate with each other.

13. The method of manufacturing a liquid jet head according to claim 11, characterized in that the protective film is removed by dry etching in the step of allowing the reservoir portion and the communicating portion to communicate with each other.

14. The method of manufacturing a liquid jet head according to claim 11, characterized in that a material different from that for the connection wiring is used for the protective film.

15. The method of manufacturing a liquid jet head according to claim 11, characterized in that the protective film is formed of any one of an oxide film, a nitride film, an organic film and a metal film.

* * * * *